(12) United States Patent
Dominic

(10) Patent No.: US 7,552,470 B2
(45) Date of Patent: Jun. 23, 2009

(54) GENERIC SECURITY INFRASTRUCTURE FOR COM BASED SYSTEMS

(75) Inventor: Pushparani M. Dominic, Kar (IN)

(73) Assignee: Honeywell International Inc., Morristown, NJ (US)

( * ) Notice: Subject to any disclaimer, the term of this patent is extended or adjusted under 35 U.S.C. 154(b) by 722 days.

(21) Appl. No.: 10/302,534

(22) Filed: Nov. 21, 2002

(65) Prior Publication Data
US 2004/0103323 A1 May 27, 2004

(51) Int. Cl.
H04L 9/32 (2006.01)
(52) U.S. Cl. .......................................... 726/8
(58) Field of Classification Search ............... 726/2
See application file for complete search history.

(56) References Cited

U.S. PATENT DOCUMENTS

| | | | | |
|---|---|---|---|---|
| 5,491,752 | A * | 2/1996 | Kaufman et al. | 380/30 |
| 5,684,950 | A * | 11/1997 | Dare et al. | 726/10 |
| 5,748,739 | A | 5/1998 | Press | 713/164 |
| 5,968,176 | A | 10/1999 | Nessett et al. | 713/201 |
| 6,154,741 | A | 11/2000 | Feldman | 707/9 |
| 7,137,006 | B1 * | 11/2006 | Grandcolas et al. | 713/180 |
| 2003/0204732 | A1 * | 10/2003 | Audebert et al. | 713/182 |
| 2003/0212863 | A1 * | 11/2003 | Ganguly et al. | 711/118 |
| 2003/0221112 | A1 * | 11/2003 | Ellis et al. | 713/189 |

FOREIGN PATENT DOCUMENTS

| | | |
|---|---|---|
| EP | 0660234 A2 | 6/1995 |
| WO | WO-0213437 A2 | 2/2002 |

OTHER PUBLICATIONS

William Stallings (Book, title, "Cryptography and Network Security", principles and practices, Second Edition) (Year of Publication, 1999 (p. 323-330).*
Ping, L , "The design and Implementation of a reference monitor for the 2k operating system", *Internet*, (1999),4, 12-15, 17-19.

* cited by examiner

*Primary Examiner*—Benjamin E Lanier
*Assistant Examiner*—Samson B Lemma
(74) *Attorney, Agent, or Firm*—Kris T. Fredrick

(57) ABSTRACT

The present invention provides a generic technique to perform access control check for data access and/or for doing an operation in a COM based system comprised of multiple servers and having multiple users. A unique user security context number is generated after validating the user for a session, based on user entered authentication parameters. The generation of the security context numbers and the fetching of the access control information from storage medium is managed by a central security server. The generated unique user security context number is then used throughout the session to check for access permission for data access and/or to perform an operation requested by the user during the session.

16 Claims, 8 Drawing Sheets

GENERIC SECURITY INFRASTRUCTURE FOR COM BASED SYSTEMS

FIELD OF THE INVENTION

This invention generally relates to security infrastructures for distributed computer applications, and in particular to a generic security structure separating out implementation of security related issues like authentication and access control in component object model (COM) based systems (or applications).

BACKGROUND

As more business is done on computers, and particularly as more business is done and information is exchanged across and within computer networks using distributed applications, security management features, such as access control for determining which application users, based on their roles and security permissions, may obtain access to which data or other computerized resources across these computer networks becomes increasingly important. Access control involves logic for deciding whether an application user should be given access to a particular computing resource. For example, access control can provide differing levels of database access in terms of which rows and columns may be accessed by a user for reading or updating In Component Object Model (COM) based systems users logging into a computing resource are authenticated by user name and password. COM is a software architecture that allows a distributed system to be realized using components that provide interoperability. Components are generally software including groupings of logical functions that comprise interfaces. Components can be, for example, a database read component or a database write component, which can be configured to provide access permissions to users based on their roles, such as administrators, analysts, end users, and operators. COM servers hereby referred to as servers are executable modules that has a process space of its own in the operating system. A dynamic link library is a set of source code functions with file extension .dll that requires a server to load it and execute the code. Microsoft Corporation has developed a Microsoft Transaction Server (MTS) infrastructure that aids in COM development on Windows platforms, such as Windows® 95, 98, 2000, XP, and NT. Distributed Component Object Model (DCOM) systems, may comprise more than one server or module that interact with each other to provide services. These servers can run on several computing machines including different computing resources.

In such COM based systems, when the user has been authenticated, the system lets the user gain access to data to which he has been granted permission. In addition, based on the user's roles, the user can be permitted or denied to perform subsequent operations on the system. For example, a configuration application may allow one user to download configuration data to a panel, and may not allow another user to perform the same operation. In COM based systems, comprised of many servers, it may also be necessary to prevent users from accessing these servers directly, bypassing the login mechanism. Currently in COM based systems, different systems address access control needs in different ways, generally dictated by the application being used. These would typically be application specific and the implementation of the access checks need to be done by all the servers. This results in overhead in terms of access check being done more than once, if an operation spans across many servers. Besides there is no generalized way to prevent external users from using the servers, directly bypassing the login mechanism.

In an MTS infrastructure, there is generally a tight coupling between the functionality of the components in the system and the security needs. Therefore security needs and the interface of COM components in the MTS infrastructure need to be considered during the design phase. For example, COM interfaces may include customer data read, panel data read and so on. Security needs may require administrators and analysts to have access to customer data, whereas operators or end users may only need access to panel data. Therefore, security needs have to be decided during the design phase. Reprogramming systems later to adapt to new conditions, such as new levels of access or new groups to whom access may be granted, can be very cumbersome and can require changing the code and the design itself and this generally may not be a feasible solution. It is generally not possible to dynamically reconfigure access permissions in MTS based security infrastructures. It is also not possible to change the access information dynamically while the system is running and have the changes take effect immediately.

Further, in an MTS infrastructure, security and access control is generally operating system dependent. For example, MTS security and access control based on the Windows® NT authentication scheme, may not work in other Windows® operating environments, such as Windows® 95 and 98.

Currently, there is no common infrastructure to handle security or access controls in COM based systems. Therefore, whenever new components/servers are added, security implementation will need to be repeated to include the additional components and servers. Generally, security solutions in MTS infrastructures are specific to each application and there is no standardized way of handling the security needs of applications needing various levels of security, such as record level, field level, or based on a user activity. Also, in MTS infrastructures, users are checked for access permission more than once when the operation involves using more than one component. This can be a significant performance overhead.

SUMMARY OF THE INVENTION

The present invention provides a generic technique to perform access control checking for data or resource access and for performing an operation in a COM based system comprised of multiple servers and having multiple users. This security infrastructure avoids duplicating the security check by multiple servers and hence speeds up the security operation and also allows for dynamically updating of the access control information without requiring any design modifications to the existing system and have the changes take effect immediately. The infrastructure also takes care of the access control checking in distributed system where the servers are distributed across machines.

In one example embodiment, a security client module is associated with each of the servers and a centralized Security Server module. Security Server module is responsible for keeping track of all access control information and user log-in information and also for generating unique security context numbers. In COM based systems, the security client consists of a security agent component in a dll and a security monitor component housed inside the server to which it is associated. One instance of security agent, which is in a dynamic link library, shall be running in the process space of each of the servers. The security server generates a unique user security context number after validating the user for a session, based on user entered authentication parameters. The generated unique user security context number is then used throughout the session to check for access permission for the data access or to perform operations requested by the user during the session. The first time a security check is done by a server for a user, the security client associated with the server fetches the access control information for that user from the security server. This access control information is stored in the security client's local cache so that further security checks are done locally and so will be faster.

In a further embodiment, a software executable or server generates a unique user security context number after validating the user for a session based on user entered authentication parameters. In the same way, each time a server is executing, it is assigned a unique security context, henceforth referred to as a server security context. Further, the server requesting the use of another server will be validated upon passing a unique server security context number to the other server before the other server is allowed to perform the operation. The same method is used for each server when the user requested operation requires using one or more other servers in the system.

In yet another embodiment a generic security system provides access control for data and operations in a COM based system. The generic security system for COM based systems uses database or LDAP (lightweight directory access protocol) for storing security information about the system users, access control information and server information. This may be stored in such a way that new access control information can be added. If an access control record denies permission and another access control record allows permission, the deny is always given the precedence. Further, the generic security system includes a security server coupled to the data storage and multiple security client subsystems servers in the system. One instance of security client subsystem is associated with every server. The security server subsystem is referred to as a security server, and the security client subsystem is referred to as a security client. The security server receives authentication parameters entered by a user through the security client of a top level server in the system to gain access to the system for a session. The security server then validates the user by verifying the received authenticating parameters with the user information stored in the database or by any other authentication method upon receiving the authenticating parameters from the security client of the first server. The security server then extracts access control information from the database and generates a unique user security context number for the session upon validation. The generated unique user security context number represents the authenticated user. The security server then passes the generated unique user security context number to the security client of the first server. The first server's security client then stores the passed unique user security context number. When the user tries to access some data or perform an operation that requires a security check, the security server obtains the access control information for the user and passes it to the security client. The permission check is done by the security client and the access control information obtained is stored for any further security checks for the same user as long as the user is logged into the system. When the user requested operation requires use of a second server, the security context of the first server is passed to the second server, whereupon the second server checks for the validity of the security context with the security server. If this is the first request coming from the first server, the second server uses the security server to check for permission for the received security context. The security server, after validation of the security context, passes the result to the security client of the second server. The access control information for any server in the system will be empty which indicates that the server is given full permission once it is validated. The second server stores the security context for future reference.

Any server security context is given full permission to do any operation or for any data access. So the security checking done by the second server shall be faster since there is no access control information associated with the server security context. This means that if a request is made to a server passing any other server's security context, full permission is granted for that operation. To prevent anyone from making a request to the second server, by directly passing a server security context, when a server comes up, its security client makes a request to the security server passing in the server name and machine name. The Security server after validating the server name and machine name generates the server security context and passes this using callback mechanism to the security client of the newly instantiated server. The callback mechanism ensures that only the right server gets the server security context. This callback mechanism is achieved by having a security monitor component embedded into each server. The security server shall get the Class Id (CLSID) of this component from the database or any other location where this is configured during the system setup. This Class Id shall be unique for each security monitor associated with each any server. When the Security server tries to create the security monitor it gets created in the process space of the server and so the server security context reaches the right server to which it is associated with. For additional security the server security context number may be encrypted using a public key by the security server so that only the server with the private key shall be able to decrypt the server security context number.

Other aspects of the invention will be apparent on reading the following detailed description of the invention and viewing the drawings that form a part thereof.

BRIEF DESCRIPTION OF THE DRAWINGS

The present subject matter is illustrated by way of example, and not by way of limitation, in the figures of the accompanying drawings in which like reference numerals refer to similar elements.

DETAILED DESCRIPTION

Figure 1:
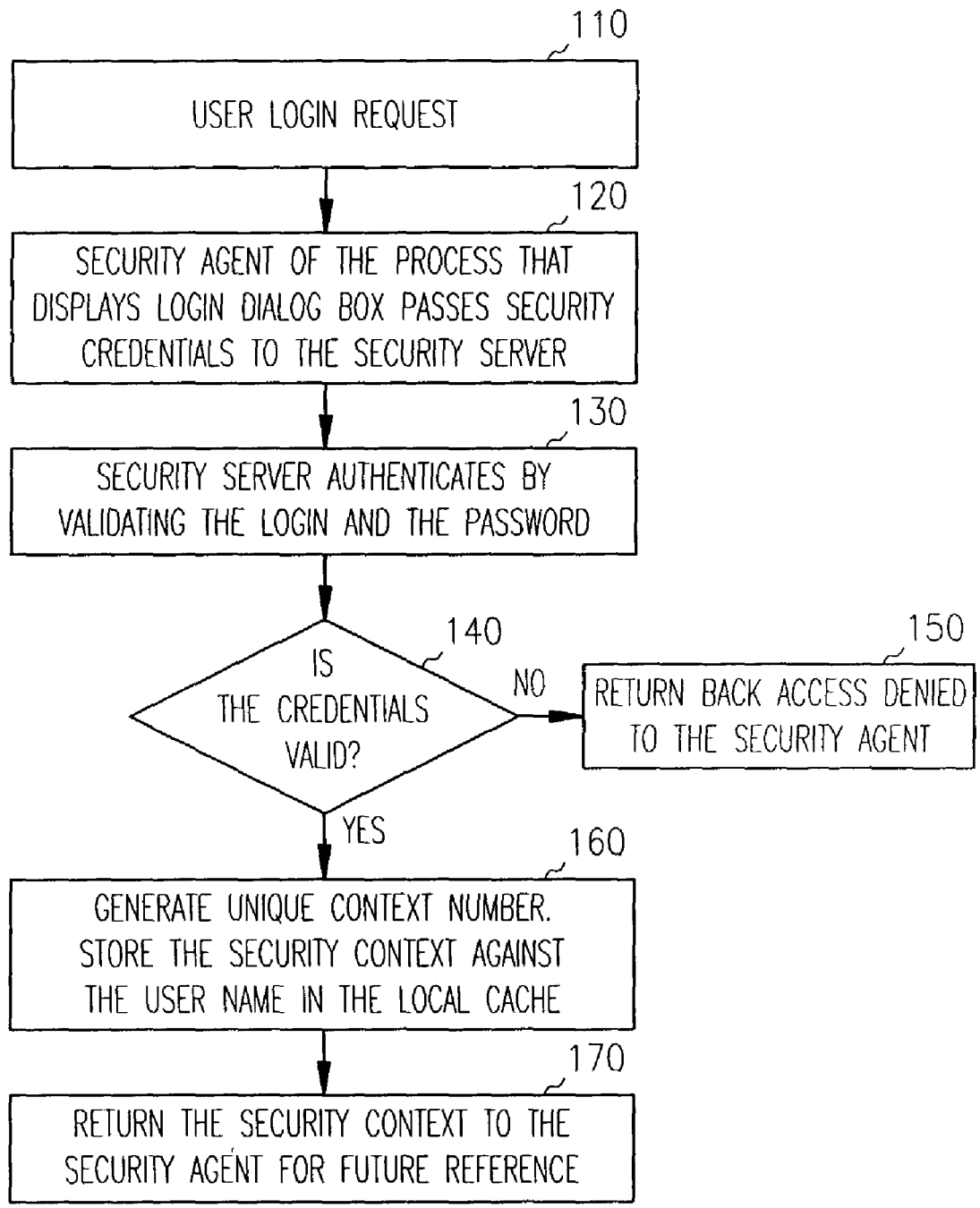
FIG. 1 is a flowchart illustrating user authentication.

In the following description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled. The following description of the preferred embodiments and various features of the invention are grouped together in a single embodiment for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single disclosed embodiment. Thus the following claims are hereby incorporated into the description of the preferred embodiments, with each claim standing on its own as a separate preferred embodiment of the invention.

The present invention provides a generic technique to perform access control checks for data access and/or for doing an operation in a COM based system having multiple users and servers. This is accomplished by having a centralized security server and a security client associated with each of the servers. The security server validates a user based on user entered authentication parameters and generates a unique user security context number. The unique user security context number is used throughout the session to provide access to multiple servers in the system during a session.

FIG. 1 is a flowchart illustrating user authentication. A user login request is represented at 110. The security agent of the server that retrieves User credentials passes entered security credentials to the security server at 120. At 130, the security server authenticates the user by validating a login and password provided by the user. This validation may be done based on a stored user credentials in a storage file or based on any other authentication means. If the credentials are not valid at 140, an access denied message is returned to the security agent at 150. In some embodiments, the login dialog box is again provided to the user for providing proper credentials. The user may be provided only a limited number of login attempts.

Once the credentials are validated at 140, a unique security context number such as a globally unique ID (GUID) is generated by the security server at 160. The security context number is stored against the user name in a local cache. At 170, the security context is also returned to the security agent for future reference.

Figure 2:
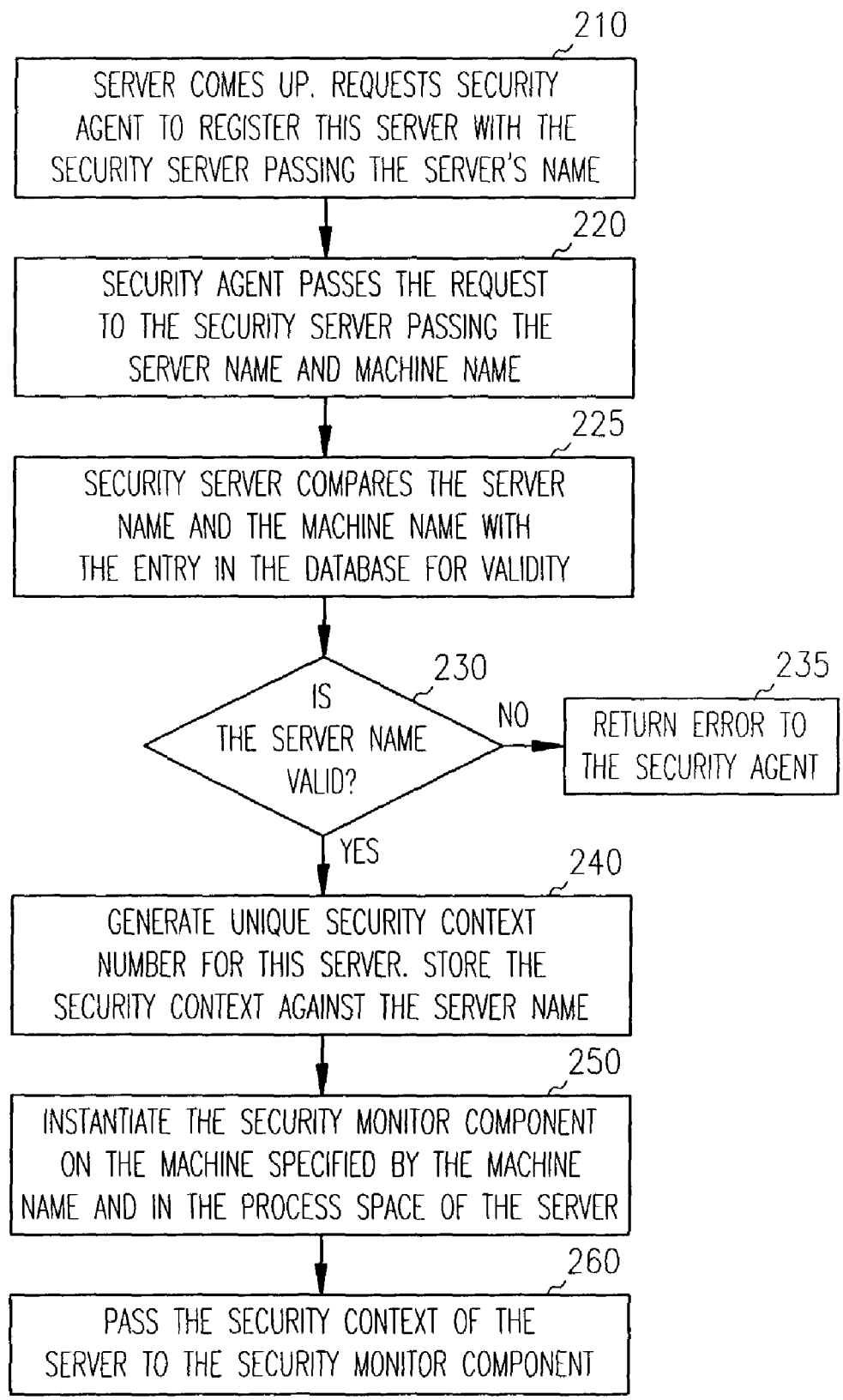
FIG. 2 is a flowchart illustrating server registration.

Server registration is illustrated in the flowchart shown in FIG. 2. When a server comes up, such as being instantiated or invoked at 210, a security agent generates a request to register the server with the security server by passing the server's name. At 220, the security agent passes the request to the security server by passing the server name and a machine name. During the configuration of the system, all the server names and the computer names where they shall run shall be configured into a storage file or database. The security server compares the server name and the machine name with an entry in its database or any storage means for validity at 225. If the server name is not valid at 230, a return error is provided to the security agent.

Once the server name is found to be valid, a unique security context number is generated for the server by the security server at 240. The security context number is stored against the server name and machine name where the server is executing. At 250, a security monitor component is instantiated on the validated server specified by the machine name in process space of the server. The security context of the server is passed to the security monitor component on the server. The security monitor is a component to which the security server calls back asynchronously. In COM this is achieved by having unique Class ID (CLSID) made known to the security server during the system setup. When the Security Server creates the component using this CLSID the component gets instantiated at the original Server process space. In order to ensure further security the security context passed asynchronously in this manner may be encrypted using asynchronous encryption mechanisms so that only the right security monitor can decipher and get the security monitor.

Figure 3:
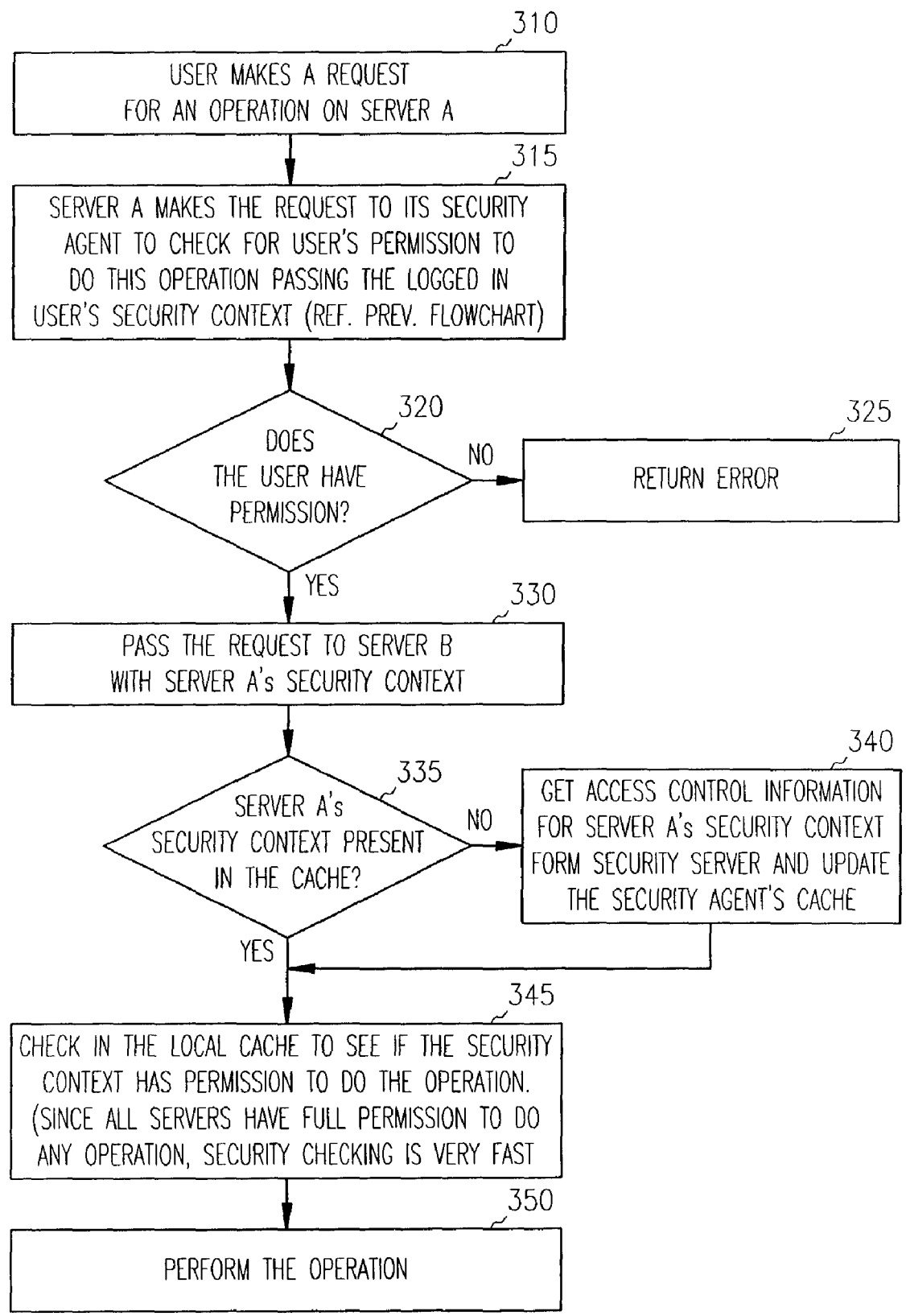
FIG. 3 is a flowchart illustrating access control checking for an operation performed by multiple servers.

FIG. 3 is a flowchart representing access control checking when a user request an operation that is performed by multiple servers. Process block 310 represents a user making a request for an operation on a server referred to as ServerA. At 315, ServerA requests its security agent to check for permission of the user to perform the operation, passing the logged in user's security context. If the user does not have permission at 320, a return error is generated at 325. If the user does have permission, the request is passed to a second server, ServerB with ServerA's security context at 330. At 335, a check is made to determine if ServerA's security context is present in the cache. If not, access control information for ServerA's security context is obtained from the security server and the security agent's cache is updated. At 345, the local cache is checked to see if the security context has permission to perform the operation. Since all servers have full permission to perform any operation in one embodiment, this check may be performed very quickly. The operation is then performed as indicated at block 350.

Figure 4:
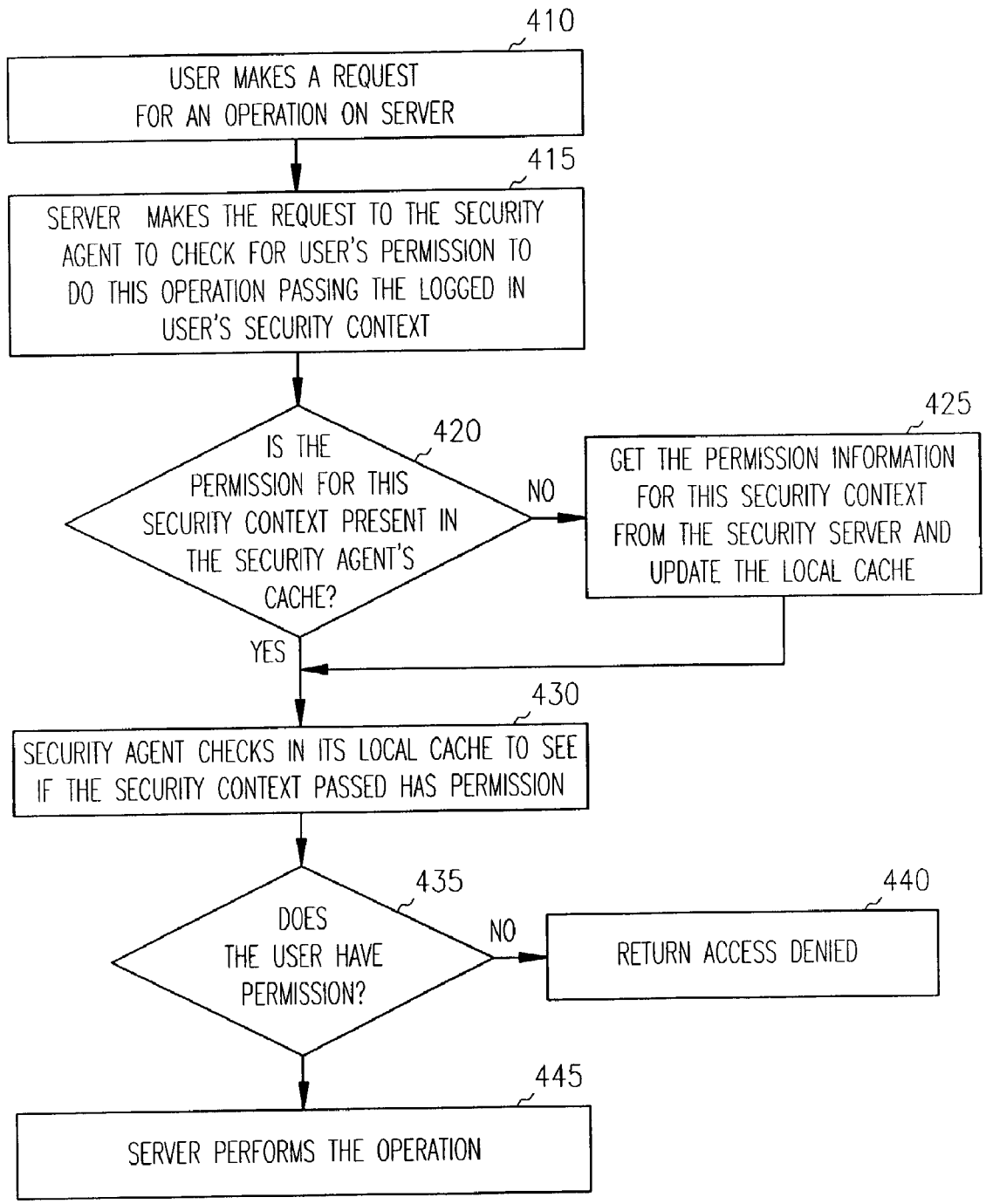
FIG. 4 is a flowchart illustrating access control checking when an operator/user requests an operation.

Access control checking when an operator/user requests for an operation to be performed by a server is illustrated in the flowchart of FIG. 4. The process begins when a user makes a request for an operation on a server at 410. The server makes the request to the security agent to check for the user's permission to have the operation performed by passing the logged in user's security context at 415. The security agent's cache is checked at 420 to determine if the permission information for this security agent is present. If not, at 425, the permission information is obtained for the security context from the security server, and the local cache is updated. If the permission information is present at 420, the security agent checks it local cache to determine if the security context passed has permission at 430.

At 435, a check is made to determine if the user has permission. If not, an access denied status or message is returned at 440. If the user does have permission, the server performs the requested operation at 445.

Figure 5:
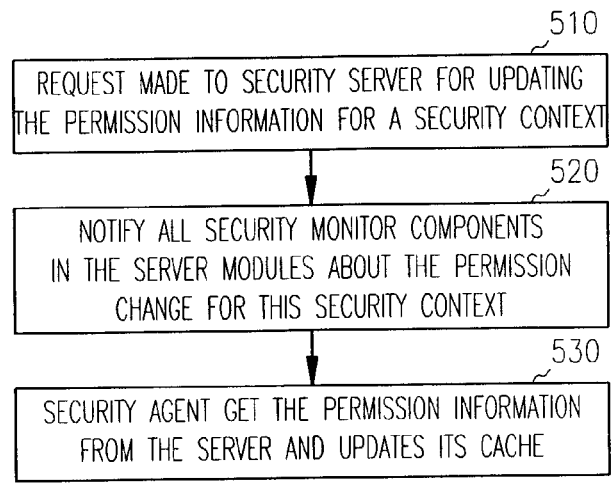
FIG. 5 is a flowchart illustrating dynamic updating of access control information.

FIG. 5 is a flowchart illustrating dynamic updating of access control information. At 510, a request is made to the security server for updating the permission information for a security context. At 520, all security monitor components in the server modules are notified about the permission change for this security context. At 530, the security agent for each server module obtains the permission information from the server and updates its cache.

Figure 6:
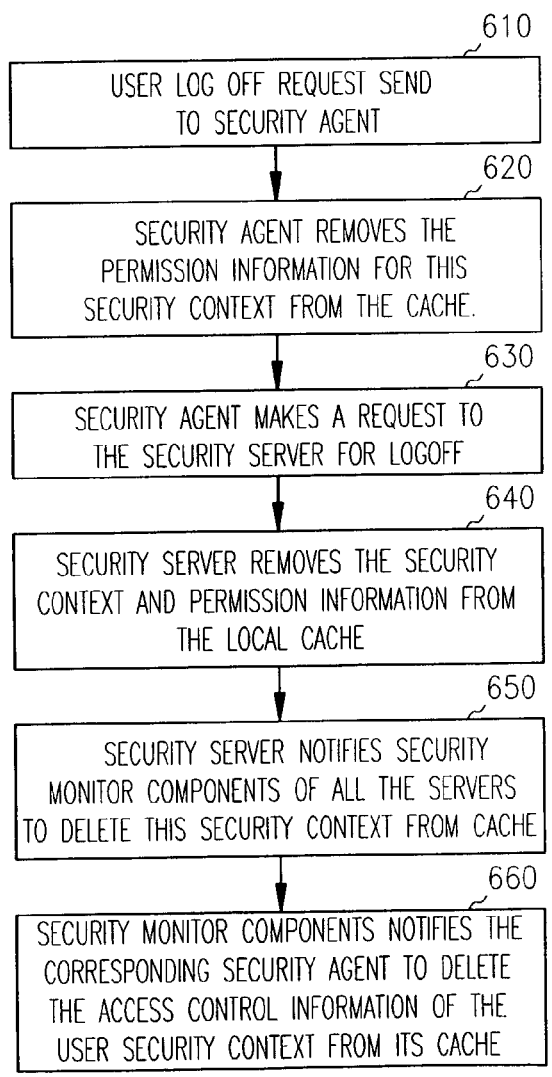
FIG. 6 is a flowchart illustrating a user logging off.

A user log off process is shown in the flowchart of FIG. 6. A user logoff request is sent to the security agent at 610. The security agent removes the permission information for this security context from the cache at 620. The security agent then makes a request to the security server for logoff of the user at 630. The security server removes the security context and permission information from the local cache at 640.

Security Server then notifies all the security monitor components of the servers that are up about the logged off user's security context at 650. The security agent of each of the servers then deletes the access control information of the logged off user's security context from their cache at 660.

Figure 7:
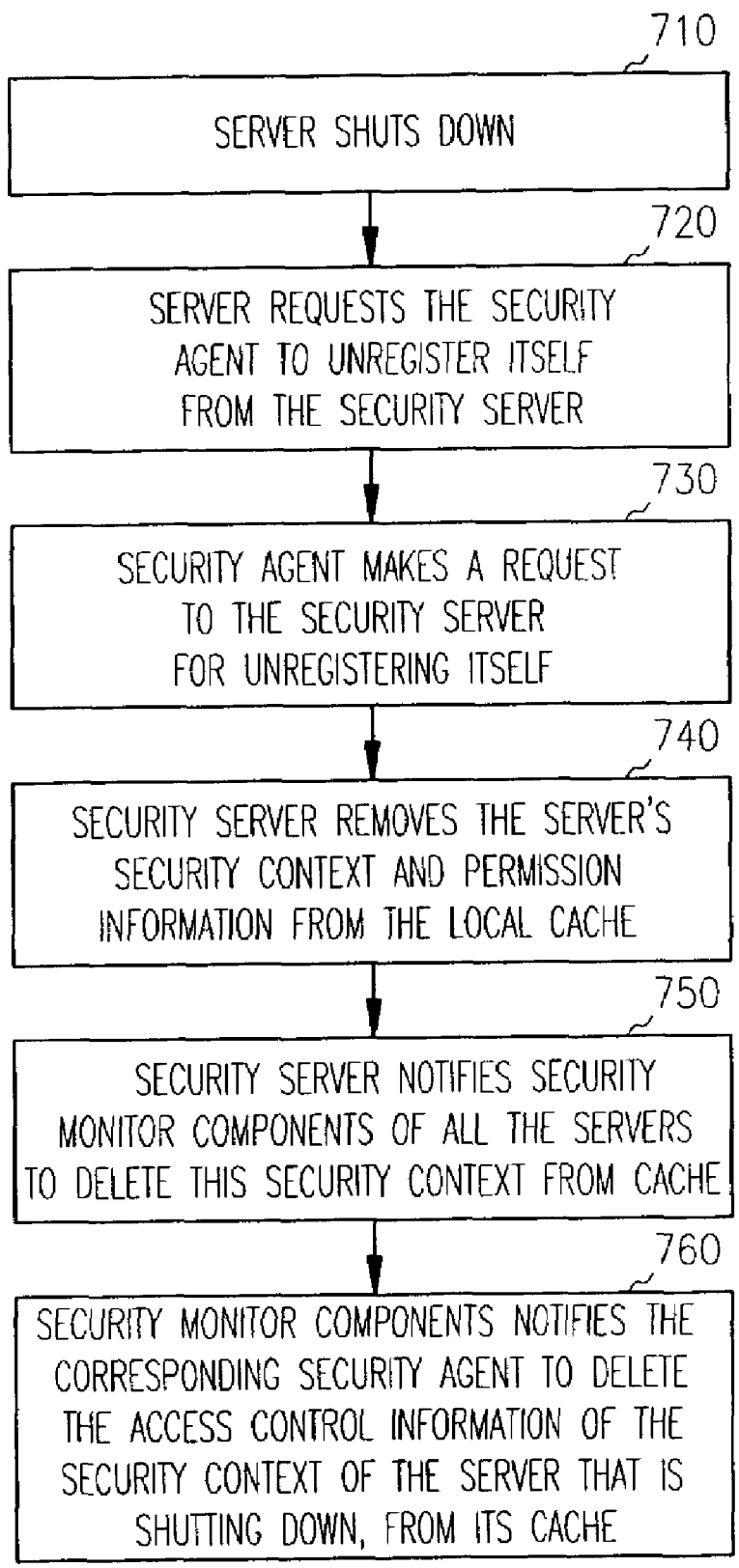
FIG. 7 is a flowchart illustrating server shutdown.

Server shutdown is illustrated in the flowchart of FIG. 7. At 710, the server initiates a shut down. At 720, the server requests the security agent to unregister itself from the security server. At 730, the security agent makes a request to the security server for unregistering itself, and at 740, the security server removes the server's security context and permission information from the local cache. The security server then notifies the security monitor components of all the servers to delete the security context from cache at 750. At 760, the security monitor components notify the corresponding security agent to delete the access control information of the security context of the server that is shutting down, from its cache.

Figure 8:
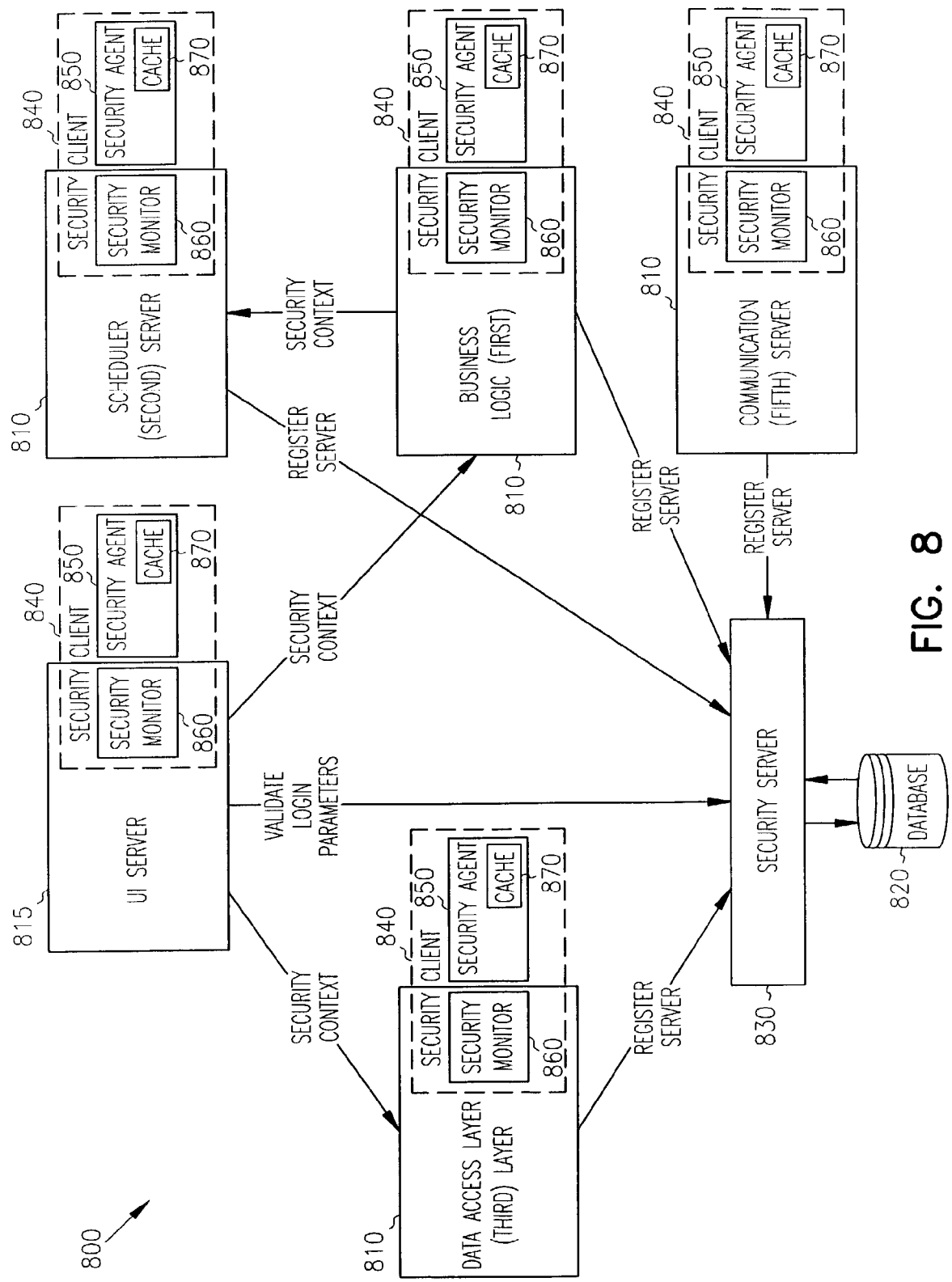
FIG. 8 is a schematic diagram illustrating one embodiment of access control in a COM based network according to the claimed subject matter.

FIG. 8 is a schematic diagram illustrating a representative database and multiple servers coupled to a security server in a COM based computer application system 800. FIG. 8 includes an example of a system including multiple servers 810, a UI server 815, and the database 820 coupled to the security server 830. Each of the multiple servers 810 includes a security client 840. Each of the security clients 840 includes a security agent 850 which is in a dill, a security monitor 860 which is housed in the server executable itself, and cache memory 870 which is maintained by the security agent. In the example embodiment shown in FIG. 8, the servers 810 implement functionalities, such as User Interface (UI), scheduling software, business logic software, and/or communication software while controlling access to data and performing operations for a user during a session.

In operation, UI server 815 receives authenticating parameters entered by a user to gain access to the system 800 to perform an operation during a session. UI server 815 then passes the entered authenticating parameters through the security agent 850 of the UI server 815 to security server 830. Security server 830 then validates the user by verifying the received authenticating parameters with user information stored in database 820. In these embodiments, security server 830 denies access to the user, when the user cannot be validated based on the received user authenticating parameters.

Security server 830 then generates a unique user security context number for the user for the session after a successful validation of the user entered authenticating parameters. The generated unique user security context number represents the validated user based on the user's stored access control information in the database. In these embodiments, security server 830 dynamically generates the unique user security context number while the system is in operation. The generated unique user security context number is a unique random number. In some embodiments, security server 830 encrypts the generated unique random number to further enhance the security.

Security server 830 then passes the generated unique user security context number, to the security agent 80 of UI server 815. UI server 815 then stores the received unique user security context number in the cache memory 870 of the UI server 815.

After validation of the user, the user can request to perform an operation using the first server in the multiple servers 810 in the system 800. Security agent 850 of UI server 815 then passes the unique user security context number to the first server. First server then checks for user access control information in the cache memory 870 of the first server. First server then performs the requested operation if the user access control information is in the cache memory 870 of the first server. If the first server cannot find the user access control information in the cache memory 870 of the first server, then the first server obtains the user access control information from the security server 830 and performs the requested operation based on the obtained access control information and the unique user security context number.

When the user requested operation on the first server requires further operation on a second server, the security client 840 of the first server then sends a unique server security context number of the first server along with a request to do an operation on a second server in the system to a security client 840 of the second server. Second server then checks for access control information for the unique server security context number of the first server in the cache memory 870 of the second server. If the second server has the access control information associated with the unique server security context number of the first server, the second server then performs the required operation on the second server. If the second server cannot find the access control information in the cache memory 870 of the second server, then the second server obtains the access control information associated with the unique server security context number of the first server and then performs the requested operation on the second server. The above-described process is repeated for other servers when the first and second servers require further operations to be performed on other servers in the system 800.

In these embodiments, security agent 850 associated with each of the servers 810 registers the associated server with the security server 830 by passing the associated server authenticating parameters and other associated server information to the security server 830 when each server comes-up in the system 800. Security server 830 then validates each of the received authenticating parameters and generates associated unique server security context number based on a successful validation. Security server 830 then passes the generated unique server security context number to the associated server by passing it to the security monitor 860 of the server. Each of the security servers 810 then stores the unique security context number.

The generated and stored unique user and server security context numbers are passed between the multiple servers 810 and associated security clients 840 in the system 800 to validate the user and the servers trying to gain access to one or more software applications stored in the multiple servers 810 to perform the user requested operation during the session and until the user logs off the system. The security context of the server is given full permission and so the security checking is faster. Security client associated with each of the multiple servers 810 removes the stored unique user and server security context numbers and any other user and server access control information when the user logs off from the system 800.

In some embodiments, security server 830 notifies the security monitor 860 of all the servers that have come up and security agents which are informed by the security monitor updates dynamically cache memories 870 when a request to update the user and server access control information is received from a system administrator through the security server 830.

Figure 9:
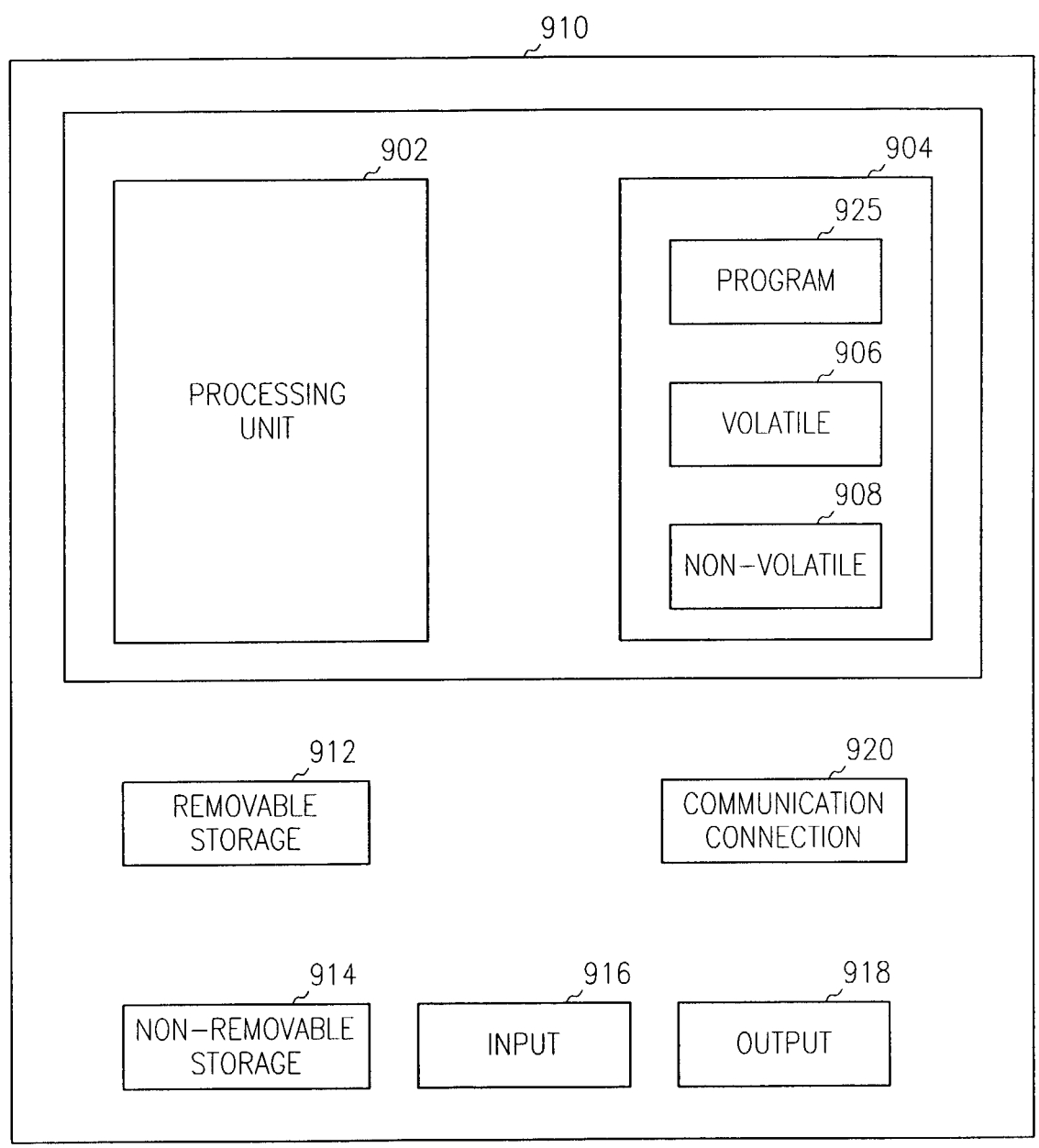
FIG. 9 shows an example of a suitable computing system environment for implementing embodiments of the present invention.

FIG. 9 shows an example of a suitable computing system environment 900 for implementing embodiments of the present invention. Various aspects of the present invention are implemented in software, which may be run in the environment shown in FIG. 9 or any other suitable computing environment. The present invention is operable in a number of other general purpose or special purpose computing environments. Some computing environments are personal computers, server computers, hand-held devices, laptop devices, multiprocessors, set top boxes, network PCs, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

FIG. 9 shows a general computing device in the form of a computer 910, which may include a processing unit 902, memory 904, removable storage 912, and non-removable storage 914. Memory 904 may include volatile memory 906 and nonvolatile memory 908. Computer 910 may include—or have access to a computing environment that includes—a variety of computer-readable media, such as volatile memory 906 and non-volatile memory 908, removable storage 912 and non-removable storage 914. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 910 may include or have access to a computing environment that includes input 916, output 918, and a communication connection 920. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 902 of the computer 910. A hard drive, CD-ROM, and RAM are some examples of articles including a computer-readable medium. For example, a computer program 925 capable of providing a generic technique to perform access control check for data access and/or for doing an operation on one of the servers in a COM based system according to the teachings of the present invention may be included on a CD-ROM and loaded from the CD-ROM to a hard drive. The computer-readable instructions allow computer system 900 to provide generic access controls in a COM based computer application system having multiple users and servers.

CONCLUSION

The above-described invention provides a generic technique to implement access control feature in COM based systems having multiple users and servers. In addition, the generic technique provides capability to reconfigure systems to dynamically change needs of database security and access control. Further, the technique provides capability to dynamically reconfigure security privileges without having to bring down the systems to reduce downtime. Furthermore, the technique provides a generic infrastructure that can run on any operating system that supports a COM based system. This technique also supports systems that are distributed across multiple computers.

The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A method of providing access control to perform a user requested operation during a session in a COM based computer application system having multiple users and servers, comprising:

a security server validating a user to log in to the system for the session by verifying user entered authenticating parameters;

a security server generating a single unique user security context number that represents the validated user for the session;

storing the single unique user security context number;

user requesting access to perform an operation on a server in the system during the session by passing the single unique user security context number;

if access control information for the user is not in the server, then obtaining the access control information for the user;

storing the access control information for the user security context in the security client's cache; and performing the user requested operation on the server during the session based on the access control information and the single unique user security context number;

wherein the single unique user security context number, without exchanging itself for a different context number, allows access to data on multiple servers, or operations to be performed by multiple servers;

when a server comes up first, its security agent registering with the security server passing the server name and machine name on which the server is executing, the security server upon validation of the server credentials, generating a unique server security context, the security server passing the unique server security context asynchronously to the server which is being registered, by creating a security monitor component whose ClassId is known and which is housed inside the server;

passing a unique server security context number of the server to another server in the system to perform another operation, when the user requested operation requires performing further operation on the other server;

checking if the access control information for the first server is present in the local cache of the security agent, if not present fetching it from the security server;

the security agent validating the request to use the other server by checking the access control information for the passed in server security context, verifying the passed unique server security context number against the stored access control information of the server in the other server;

granting full permission to all server security context, thereby making the further security check faster;

performing the other requested operation on the other server based on the outcome of validating the request to use the other server during the session; and repeating the passing, validating, and performing steps when the user requested operation further requires using other servers in the system during the session until the user logs off from the session.

2. The method of claim 1, wherein validating the user to login to the system further comprises:

requesting a login to use the system for a session by the user by entering authenticating parameters or using any other authentication mechanism;

verifying the user provided authenticating parameters; and if the authenticating parameters provided by the user are not valid based on the verification, then not generating a unique context number.

3. The method of claim 2, wherein validating the user comprises:
validating the user based on methods selected from the group consisting of verifying the user entered authenticating parameters with stored user information and using an authenticating mechanism supported by the resource operating system.

4. The method of claim 2, wherein the unique context number comprises a GUID.

5. The method of claim 1, wherein generating the single unique user security context number comprises:
dynamically generating the single unique user security context number while the system is in operation.

6. The method of claim 5, wherein dynamically generating the single unique user security context number comprises:
dynamically generating a unique random number; and
optionally encrypting the dynamically generated single unique user security context number for additional security.

7. The method of claim 5, further comprising:
logging off the user from the allowed session upon a request to log off from the system;
removing the stored user access control information for this user; and
informing all servers of the unregistering of the generated single unique user security context number by notifying the security monitor component of all the servers.

8. The method of claim 7, further comprising: the central security server storing all the security context of all the logged in users and the servers that are executing at any point of time; and storing the single unique user security context number against the user name and the machine name to allow for user logins to the system from multiple machines.

9. The method of claim 8, further comprising:
unregistering the generated single unique user security context number upon an abnormal shutdown of the server or system in a distributed system, by keeping track of the last activity time of the user;
informing all servers of the unregistering of the generated single unique user security context number; and
removing stored access control information.

10. The method of claim 1, further comprising:
dynamically generating a single unique user security context number each time a user logs back into the system for another session by re-entering the authenticating parameters.

11. The method of claim 1, further comprising:
security client updating the last activity time of logged in users at regular intervals to security server;
security server monitoring inactivity time of the accessed user;
comparing the inactivity time to a predetermined inactivity time; and
unregistering the generated single unique user security context number, when the inactivity time exceeds the predetermined inactivity time.

12. The method of claim 11, further comprising:
requesting authentication parameters again from the user and generating another single unique user security context number when the user tries to regain access to the system, when the user was logged off due to exceeding the inactivity time.

13. The method of claim 12, further comprising:
passing server authenticating parameters for validation, upon the server coming up in the system;
verifying the server by checking the passed server authenticating parameters with server information stored in the database;
validating the server based on the outcome of the verifying;
generating the single unique server security context number;
passing the generated single unique server security context number to the server;
storing the generated single unique server security context number in the server; and
storing the generated security context in the security server.

14. The method of claim 2, wherein generating the single unique server security context number comprises:
dynamically generating the single unique server security context number; and
optionally encrypting the generated single unique server security context number for additional security.

15. The method of claim 1, further comprising:
purging the stored single unique user security context number upon logging off the system by the user:
purging the stored single unique server security context number of a server when that server shuts down; and
informing all the other servers through the security monitor component to do clean up for this security context.

16. The method of claim 1, further comprising:
requesting to update access control information of a user through a server in the system;
notifying all servers to update the access control information for the user, upon receiving the request by sending notification through the security monitor component; and
dynamically updating and storing the access control information for the user, upon receiving the notification.

* * * * *